No. 732,007. PATENTED JUNE 23, 1903.
W. E. PARKER.
CATTLE OR STOCK GUARD.
APPLICATION FILED OCT. 18, 1902.
NO MODEL.

Witnesses: Inventor:
Bertie G. Brown. William E. Parker,
S. R. Brattain. by Collamer & Co.,
Attorneys.

No. 732,007. Patented June 23, 1903.

UNITED STATES PATENT OFFICE.

WILLIAM EDGAR PARKER, OF McDONOGHVILLE, LOUISIANA.

CATTLE OR STOCK GUARD.

SPECIFICATION forming part of Letters Patent No. 732,007, dated June 23, 1903.

Application filed October 18, 1902. Serial No. 127,897. (No model.)

*To all whom it may concern:*

Be it known that I, WILLIAM EDGAR PARKER, a citizen of the United States of America, residing at McDonoghville, in the parish of Jefferson and State of Louisiana, have invented certain new and useful Improvements in Cattle or Stock Guards, of which the following is a specification, reference being had therein to the accompanying drawings.

My invention relates to an improvement in a cattle and stock guard, and its novelty will be fully understood from the following description and claims when taken in connection with the annexed drawings; and the objects of my invention are to provide a guard that will effectually prevent cattle and stock from coming upon or crossing a railway-track at the intersection of a fence upon a farm, plantation, or other places upon a railway-track where it is desired that cattle or stock shall not pass or travel. I attain these objects by the mechanism illustrated in the accompanying drawings, in which—

Figure 1:
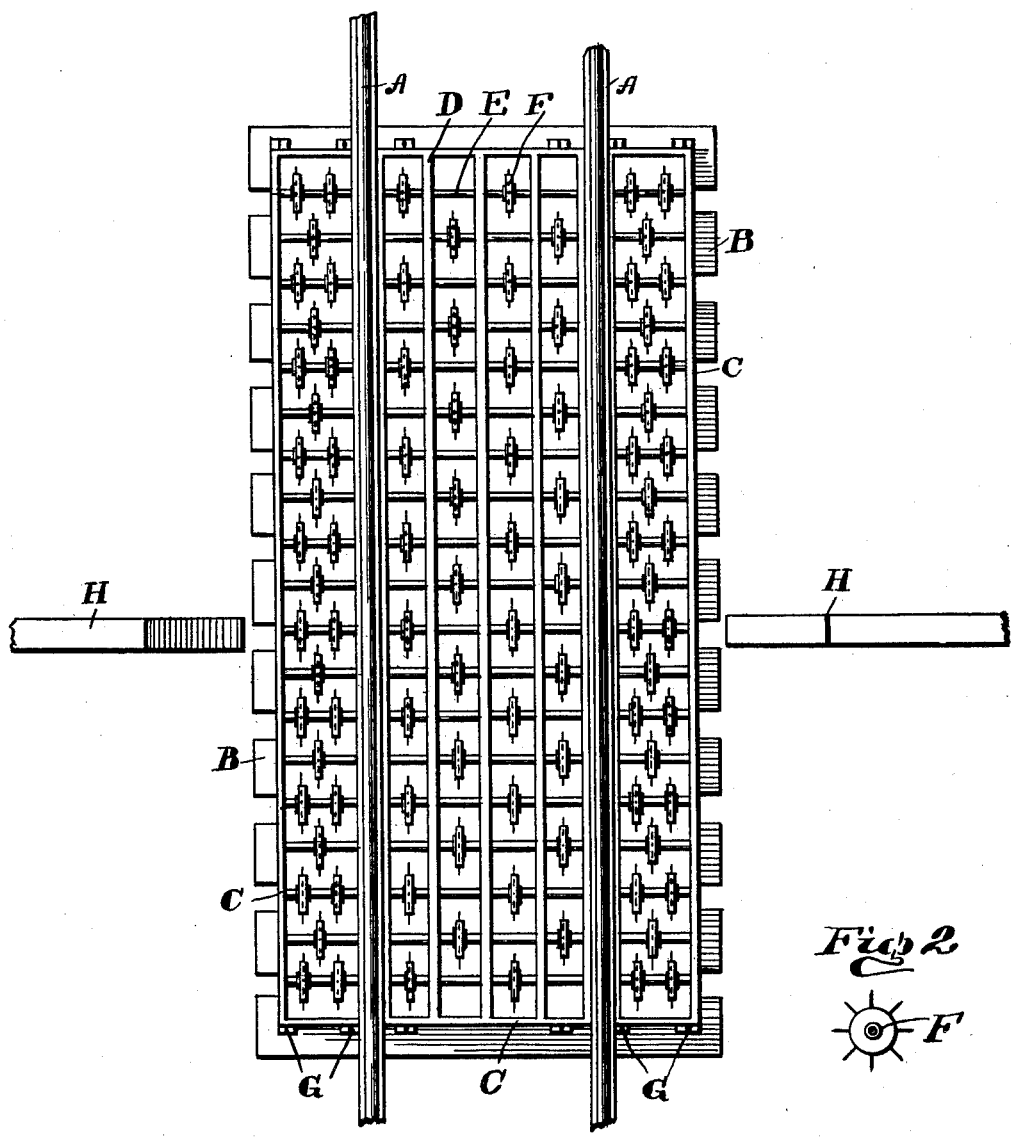
Figure 2:

Figure 1 is a top view. Fig. 2 is a side view of my barbed wheel.

Similar letters refer to similar parts throughout both views.

In the drawings, A designates a railway-track.

B designates cross-ties.

C shows a rectangular metal frame or trough having longitudinal partitions or supports D for metal shafts E, which project through the supports D. Placed upon shafts E are wheels F, which are provided with barbs, teeth, or spikes, as may be desired, and are mounted upon shafts E, so as to rotate freely without lateral movement, the shafts being held in a rigid position; but where desired the shafts E can be so placed as to rotate and the wheels may be held rigidly; but I find to obtain best results the shaft should be held in a fixed position and the wheels placed in such near proximity to each other that their peripheries are near each other, thus forming a network of wheels and making it impossible for cattle, stock, or human beings to walk or stand upon my guard. Partitions D are not only essential for the proper support of shafts E, but also form with the latter a lattice-work between the wheels—an arrangement which makes it impossible for an animal's hoof to become wedged in the guard.

H shows a fence which forms an inclosure and through which a railway-track is located.

In practice my guard is placed at the intersection of a fence, as shown in Fig. 1. The guard is placed upon the cross-ties both between and at each side of the track, and the shafts are mounted at a sufficient elevation above the bottom of the frame to permit the wheels F to rotate freely when the hoof of an animal is placed upon the guard, the wheels F being mounted so close to each other that, together with the intersecting partitions and shafts, they make it impossible for the hoof or foot of an animal to pass between the wheels, said wheels being of any desired dimensions.

Having described my invention and the manner in which the same is or may be carried into operation, I would say in conclusion that I do not limit myself to the precise details shown in illustration, as the same may be varied to some extent; but

What I claim, and desire to secure by Letters Patent, is—

1. A railroad cattle-guard comprising a frame, longitudinal partitions therein, transverse shafts mounted in said frame and partitions, and wheels journaled upon said shafts and adapted to rotate freely thereon while fixed against lateral movement.

2. A railroad cattle-guard comprising a rectangular trough-shaped frame, longitudinal partitions therein, transverse shafts mounted in said frame and partitions, and spiked wheels journaled upon said shafts and adapted to rotate freely thereon while fixed against lateral movement.

3. A railroad cattle-guard comprising a plurality of rotatable wheels mounted in a rectangular frame, transverse shafts upon which said wheels are journaled, and longitudinal partitions standing on edge between the sides of the wheels and forming with the shafts a lattice-work between said wheels.

In testimony whereof I affix my signature in presence of two witnesses.

WILLIAM EDGAR PARKER.

Witnesses:
ALPHONSE J. CUNEO,
I. E. TEWELL.